T. P. HORNBROOK.
Bee Hive.
No. 32,367.
Patented May 21, 1861.
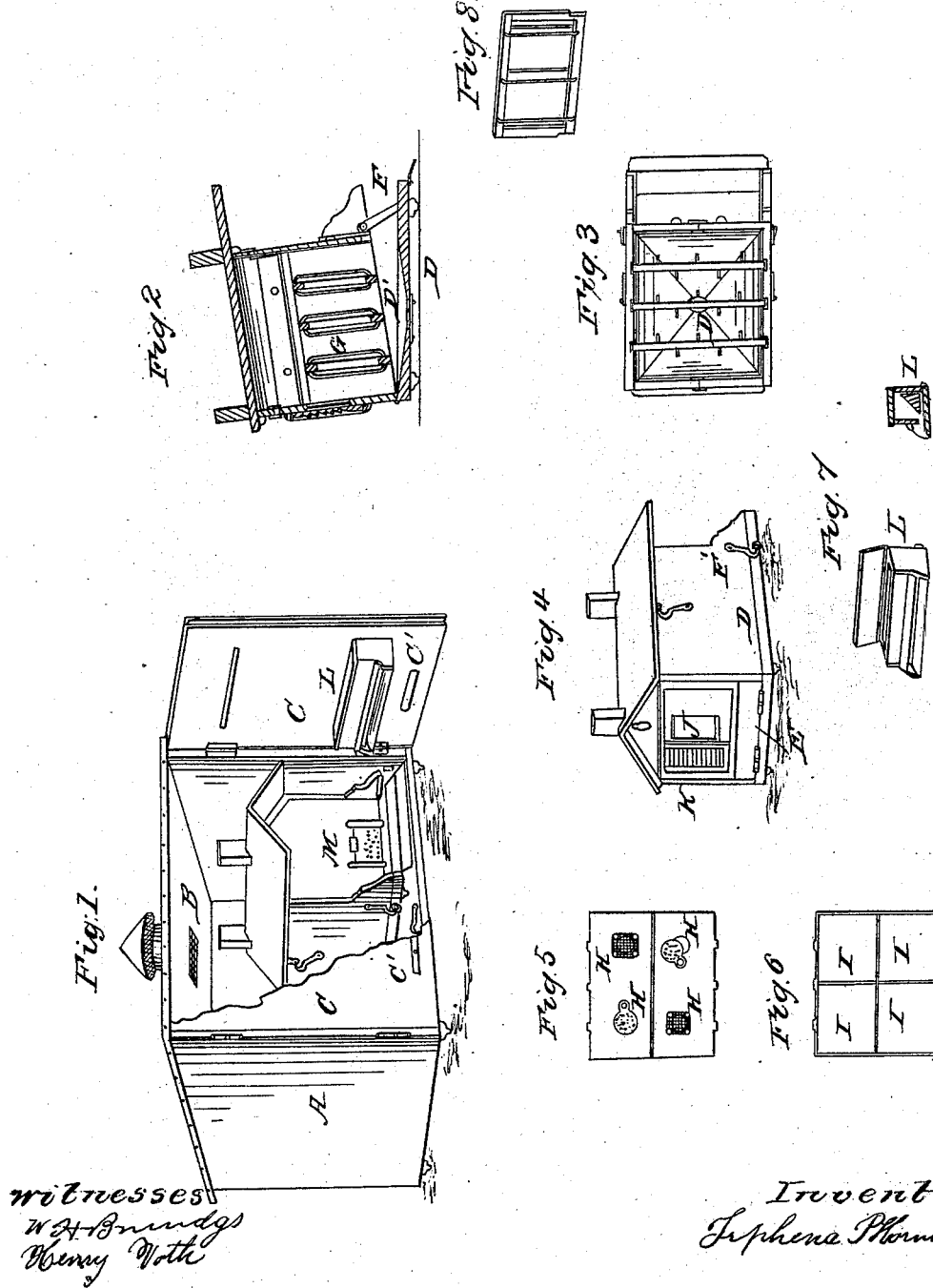

UNITED STATES PATENT OFFICE.

TRIPHENA P. HORNBROOK, OF WHEELING, VIRGINIA.

BEEHIVE.

Specification of Letters Patent No. 32,367, dated May 21, 1861.

*To all whom it may concern:*

Be it known that I, TRIPHENA P. HORNBROOK, of Wheeling, in the county of Ohio and State of Virginia, have invented certain new and useful Improvements in Beehives; and I do hereby declare that the following is a full and complete description of the construction of the same, reference being had to the accompanying drawings, making part of this specification, in which—

Figure 1, is a perspective view of the outer case, with one door open, showing a hive in place, and the feeding box attached to the inside of the door of the case. Fig. 2, is a vertical section of the hive. Fig. 3 is a horizontal section. Fig. 4 is a perspective view of the hive. Fig. 5, is a view of division between the body of the hive and the honey boxes. Fig. 6, shows the honey boxes. Fig. 7 is a view of the feed box, and Fig. 8, is a view of the comb frames.

Like letters refer to like parts.

The points of novelty in this invention relate to the general arrangement of the hive in relation to its outer case, to the dirt space beneath the hive, and to the feeding box, attached to the door of the outer case.

A, represents the outer case. This may be of suitable size to contain two or more hives. It is provided with the means of ventilation both in the bottom and top, the ventilation at the top being shown at B. This case is made tight at the doors C, but is provided with an opening C' which can be closed or opened at pleasure, for the ingress and egress of the bees.

D, represents the bottom board of the hive. This is scooped out as seen at D' Fig. 2, and provided with a hole in the center for ventilation and the discharge of any impure matter that may collect upon the bottom board. The center of this depression where the hole penetrates, is provided with a sliding cover, so that the hole can be closed.

The bottom board is hinged to the body of the hive at the back part, as seen at E, Fig. 4, so that it can be elevated in front as seen in Fig. 2, and held in that position by the support F. The hooks F' serve to keep the bottom from dropping when the hive is lifted from its place.

The body of the hive is occupied by the comb frames G, shown also in detached Fig. 8. The space immediately above the body of the hive, is occupied by the honey boxes Fig. 6. The floor upon which these stand is shown in Fig. 5, and is provided with four ventilators, H, there being one for each of the boxes I. The cover of the hive, may be in the form of a pitch roof, so that the space above the honey boxes may serve as a receptacle for the moist air, arising from the respiration of the bees. In the back end of the hive is a glass window J, that can be closed with the slide K, to exclude the light. This glass window is for the purpose of inspecting the contents of the hive at pleasure.

The feeding box L, is attached to the door of the outer case, in such a manner that it can be removed at pleasure, and in such position that when the outer door is closed, the feeding trough shall be in contact with the front of the hive, so that the bees can come out and feed, in case there should be a necessity for supplying them with food. The form and structure of the feeding box, is shown in Fig. 7.

The entrance to the hive is provided with a perforated slide M, that can be closed, to prevent the ingress or egress of the bees at pleasure.

I am aware that separate apartments for bees have been inclosed in a larger case, and also, that feeding troughs have been used. But I am not aware that the whole hive, with its separate apartments, have been thus inclosed in an outer case, or that a detachable feeding trough has been connected with the door of the outer case. Therefore, I do not claim any of these devices separately considered; but What I do claim as my improvement, and desire to secure by Letters Patent, is—

Inclosing the whole hive, when constructed and arranged as herein specified, within an outer case, in combination with the detachable feed trough attached to the door of the outer case, the several parts being arranged as and for the purposes specified.

TRIPHENA P. HORNBROOK.

Witnesses:
W. H. BURRIDGE,
HENRY VOTH.